US012663106B2

(12) United States Patent
Wang et al.

(10) Patent No.: US 12,663,106 B2
(45) Date of Patent: Jun. 23, 2026

(54) QUICKLY ASSEMBLABLE AND DISASSEMBLABLE TARGET PART CONNECTING STRUCTURE FOR BNCT AND METHOD THEREFOR

(71) Applicant: Huapeng Neutron Technology (Hangzhou) Co., Ltd., Hangzhou (CN)

(72) Inventors: Sheng Wang, Hangzhou (CN); Jinglun Li, Hangzhou (CN); Bin Zhao, Hangzhou (CN)

(73) Assignee: Huapeng Neutron Technology (Hangzhou) Co., Ltd., Hangzhou (CN)

( * ) Notice: Subject to any disclaimer, the term of this patent is extended or adjusted under 35 U.S.C. 154(b) by 0 days.

(21) Appl. No.: 19/214,109

(22) Filed: May 21, 2025

(65) Prior Publication Data

US 2025/0375623 A1     Dec. 11, 2025

(30) Foreign Application Priority Data

Jun. 7, 2024     (CN) .......................... 202410734192.2

(51) Int. Cl.
| | |
|---|---|
| *F16L 23/024* | (2006.01) |
| *F16B 39/02* | (2006.01) |
| *F16L 23/02* | (2006.01) |
| *F16L 23/032* | (2006.01) |

(52) U.S. Cl.
CPC ............. *F16L 23/024* (2013.01); *F16B 39/02* (2013.01); *F16L 23/02* (2013.01); *F16L 23/032* (2013.01)

(58) Field of Classification Search
CPC ....... F16L 23/003; F16L 23/006; F16L 23/02; F16L 23/024; F16L 23/0286; F16L 23/162; F16L 23/032; F16L 37/62; F16B 39/02
See application file for complete search history.

(56) References Cited

FOREIGN PATENT DOCUMENTS

| | | | | | |
|---|---|---|---|---|---|
| CN | 107489845 | A | * 12/2017 | ............ | F16L 23/032 |
| CN | 108131513 | A | * 6/2018 | ............ | F16L 23/024 |
| CN | 108533858 | A | * 9/2018 | ............ | F16L 23/024 |
| CN | 209705481 | U | * 11/2019 | | |
| CN | 111765282 | A | * 10/2020 | ............ | F16L 23/024 |

(Continued)

OTHER PUBLICATIONS

CN-107489845-A—Machine Translation—English (Year: 2017).*

(Continued)

*Primary Examiner* — William S. Choi
(74) *Attorney, Agent, or Firm* — Bayramoglu Law Offices LLC

(57)     ABSTRACT
A quickly assemblable and disassemblable target part connecting structure for BNCT and a method therefor are provided. The target part connecting structure at least includes a target section, a pipeline section and at least one locking device configured to connect the target section and the pipeline section, where the locking device at least includes a lock body, a lock rod and a driving mechanism. The rapid connection and quick disassembly between the target section and the pipeline section can be achieved by driving the lock rod to telescopically move along an axial direction through the driving mechanism, the operation is simple, the assembly and disassembly efficiency is high, and the convenience of replacing the target section and maintaining a vacuum system in a BNCT system is improved.

20 Claims, 8 Drawing Sheets

(56)  References Cited

FOREIGN PATENT DOCUMENTS

| CN | 112728256 A | * | 4/2021 | |
| CN | 112944074 A | * | 6/2021 | ............ F16L 23/032 |
| CN | 113217722 A | * | 8/2021 | ............ F16L 23/024 |
| CN | 113236885 A | * | 8/2021 | ............ F16L 23/024 |
| CN | 113719682 A | * | 11/2021 | ............ F16L 23/024 |
| CN | 116877808 A | * | 10/2023 | |

OTHER PUBLICATIONS

CN-108131513-A—Machine Translation—English (Year: 2018).*
CN-108533858-A—Machine Translation—English (Year: 2018).*
CN-209705481-U—Machine Translation—English (Year: 2019).*
CN-111765282-A—Machine Translation—English (Year: 2020).*
CN-112728256-A—Machine Translation—English (Year: 2021).*
CN-112944074-A—Machine Translation—English (Year: 2021).*
CN-113217722-A—Machine Translation—English (Year: 2021).*
CN-113236885-A—Machine Translation—English (Year: 2021).*
CN-113719682-A—Machine Translation—English (Year: 2021).*
CN-116877808-A—Machine Translation—English (Year: 2023).*

* cited by examiner

111

112

1121

113

14

12

QUICKLY ASSEMBLABLE AND DISASSEMBLABLE TARGET PART CONNECTING STRUCTURE FOR BNCT AND METHOD THEREFOR

CROSS REFERENCE TO THE RELATED APPLICATIONS

This application is based upon and claims priority to Chinese Patent Application No. 202410734192.2, filed on Jun. 7, 2024, the entire contents of which are incorporated herein by reference.

TECHNICAL FIELD

The present invention relates to the technical field of nuclear medicine radiotherapy, and particularly to a quickly assemblable and disassemblable target part connecting structure for boron neutron capture therapy (BNCT) and a method therefor.

BACKGROUND

After long-term development, the application of nuclear technology in the medical field has been significantly improved. Nuclear medicine imaging examinations and various radiotherapy methods have become an indispensable part of modern medicine. BNCT based on small accelerators is a new treatment method developed for cancer in recent years.

The accelerator neutron source is the key apparatus for generating the neutrons required for treatment. It mainly includes three main parts: an ion source, a vacuum acceleration system, and a guiding and focusing system. The vacuum system is an important part of the accelerator, which is composed of a vacuum pipeline and a vacuum pump. The vacuum degree inside the pipeline directly determines the quality of the beam current. Therefore, the connection of the vacuum pipeline is a crucial issue.

Currently, the connection between the target section and the vacuum pipeline often adopts vacuum flanges. Bolts and nuts are used for fixation, and the gaskets between the end faces of the flanges are squeezed to achieve the sealing effect. In this method, during the docking process of the vacuum pipeline, a relatively large number of bolts need to be manually tightened one by one. The whole process is time-consuming and labor-intensive. Moreover, in certain specific environments such as radiated space or narrow space, it is inconvenient for direct manual operation, which brings relatively great difficulties to the replacement of the target section and the maintenance of the vacuum system.

SUMMARY

The technical problem to be solved by the present invention is to address the technical defects in the prior art, where the fixed connection between the target section and the vacuum pipeline by adopting bolts and nuts leads to inconvenient operation and difficulties in replacing the target section and maintaining the vacuum system.

In order to solve the above technical problems, the technical solution provided by the present invention is as follows: a quickly assemblable and disassemblable target part connecting structure for BNCT, including: a target section, a pipeline section and at least one locking device configured to connect the target section and the pipeline section, where the locking device includes:

a lock body provided with a locking pin capable of elastically extending and contracting along a radial direction;

a lock rod provided with a lock groove for accommodating extension of the locking pin along the radial direction, where a sliding block is slidably connected in the lock groove along an axial direction, two ends of the sliding block are each provided with a first guide face and a second guide face, and the first guide face and the second guide face converge at a maximum outer diameter of the sliding block; a side of the lock groove close to a free end is provided with an accommodating groove adapted to the first guide face; and the free end of the lock rod is provided with a second guide portion;

a driving mechanism configured to drive the lock rod to telescopically move along the axial direction relative to the lock body and provide continuous pulling force in a locked state, where the driving mechanism and the lock body are fixedly disposed on the target section and the pipeline section respectively, one end of the lock rod is fixedly connected with the driving mechanism, and the other end of the lock rod is a free end; a side of the lock groove close to the free end of the lock rod is provided with an accommodating groove adapted to the first guide face; and the free end of the lock rod is provided with a second guide portion.

In a preferred embodiment, the lock body is provided with a lock hole for accommodating extension of the lock rod along the axial direction, and an inner wall of the lock hole is provided with at least one locking pin along a circumferential direction.

In a preferred embodiment, the lock body includes an inner sleeve and an outer sleeve nested with each other, the lock hole is disposed on the inner sleeve, and the inner sleeve is provided with a mounting portion configured to mount the locking pin.

In a preferred embodiment, the mounting portion includes a sinking groove disposed on an outer wall of the inner sleeve and a pin hole radially penetrating from the sinking groove to the lock hole; and a tail end of the locking pin is provided with a boss adapted to the sinking groove.

In a preferred embodiment, an elastic part is disposed between the boss and an inner wall of the outer sleeve.

In a preferred embodiment, the free end of the lock rod is provided with a lock head, the lock head sequentially includes an end head, a lock groove section and a locking section, and the lock groove is located on the lock groove section.

In a preferred embodiment, one end of the locking section close to the lock groove section is provided with an inclined transition portion.

In a preferred embodiment, the sliding block is sleeved on the lock groove section.

In a preferred embodiment, the driving mechanism includes, but is not limited to, a linear motor, a hydraulic cylinder and a pneumatic cylinder.

In a preferred embodiment, the first guide face and the second guide face are conical faces or arc-shaped faces.

In a preferred embodiment, a free end of the locking pin is provided with a first guide portion.

In a preferred embodiment, the first guide portion and/or the second guide portion is provided with a conical face or an arc-shaped face.

The present invention further provides a method for assembling and disassembling the quickly assemblable and disassemblable target part connecting structure for BNCT, at least including steps of:

step 10. a locking step, including:

step 11. aligning the lock rod with the lock body; and step 12. driving, by the driving mechanism, the lock rod to move forward until the locking pin enters the lock groove, and continuously pulling, by the driving mechanism, the lock rod backward for locking, so as to lock the target section and the pipeline section; and step 20. an unlocking step, including:

step 21. driving, by the driving mechanism, the lock rod to move forward until the locking pin passes over the sliding block via the first guide face and enters the lock groove behind the sliding block; and step 22. driving, by the driving mechanism, the lock rod to move backward, and after the locking pin acts on the second guide face of the sliding block to drive the sliding block to slide forward until the first guide face enters the accommodating groove, disengaging the locking pin from the lock groove via the second guide face, and separating the lock rod from the lock body to release a connection state between the target section and the pipeline section.

Compared with the prior art, the quickly assemblable and disassemblable target part connecting structure for BNCT and the method therefor of the present invention have the following beneficial effects:

(1) the rapid connection and quick disassembly between the target section and the pipeline section can be achieved by driving the lock rod to telescopically move along an axial direction through the driving mechanism, the operation is simple, the assembly and disassembly efficiency is high, and the convenience of replacing the target section and maintaining a vacuum system in a BNCT system is improved.

(2) based on the position change of a sliding block, the locking and unlocking are achieved by the telescopic movement of the lock rod along the axial direction, the structure is simple, the conception is ingenious, and the traditional locking and unlocking modes are changed.

(3) after locking, the pulling force is applied through the driving mechanism to make the connection between the target section and the pipeline section closer and more reliable.

DETAILED DESCRIPTION OF THE EMBODIMENTS

Figure 1:
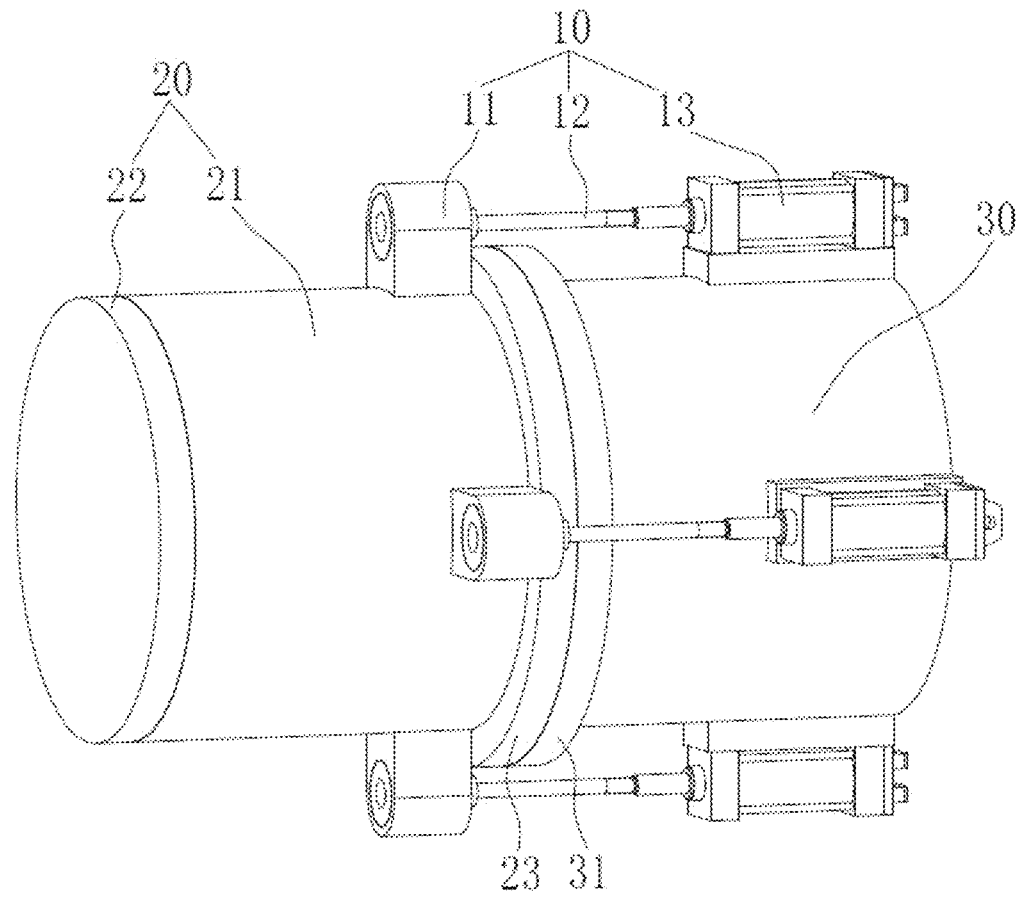
FIG. 1 is a schematic structural diagram of a quickly assemblable and disassemblable target part connecting structure for BNCT in this embodiment.

In order to make the objectives, technical solutions and advantages of the present invention clearer, the present invention will be further described in detail below in conjunction with the drawings and embodiments. It should be understood that the specific embodiments described herein are only intended to explain the present invention, and are not used to limit the present invention.

In the description of the present invention, it should be understood that the orientation or positional relationships indicated by the terms "upper", "lower", "front", "rear", "inner", "outer", etc. are based on the orientation or positional relationships shown in the drawings, which are only for the convenience of describing the present invention and simplifying the description, rather than indicating or implying that the device or element referred to must have a specific orientation, be constructed and operated in a specific orientation, and therefore cannot be construed as a limitation to the present invention.

In the description of the present invention, it should be noted that, unless otherwise clearly specified and limited, the terms "mounting", "connection" and "linkage" should be understood in a broad sense. For example, it can be a fixed connection, an integral connection, or a detachable connection; it can be the internal communication between two elements; and it can be a direct connection, or an indirect connection through an intermediate medium. For those of ordinary skill in the art, the specific meanings of the above terms in the present invention can be understood according to specific situations.

Figure 2:
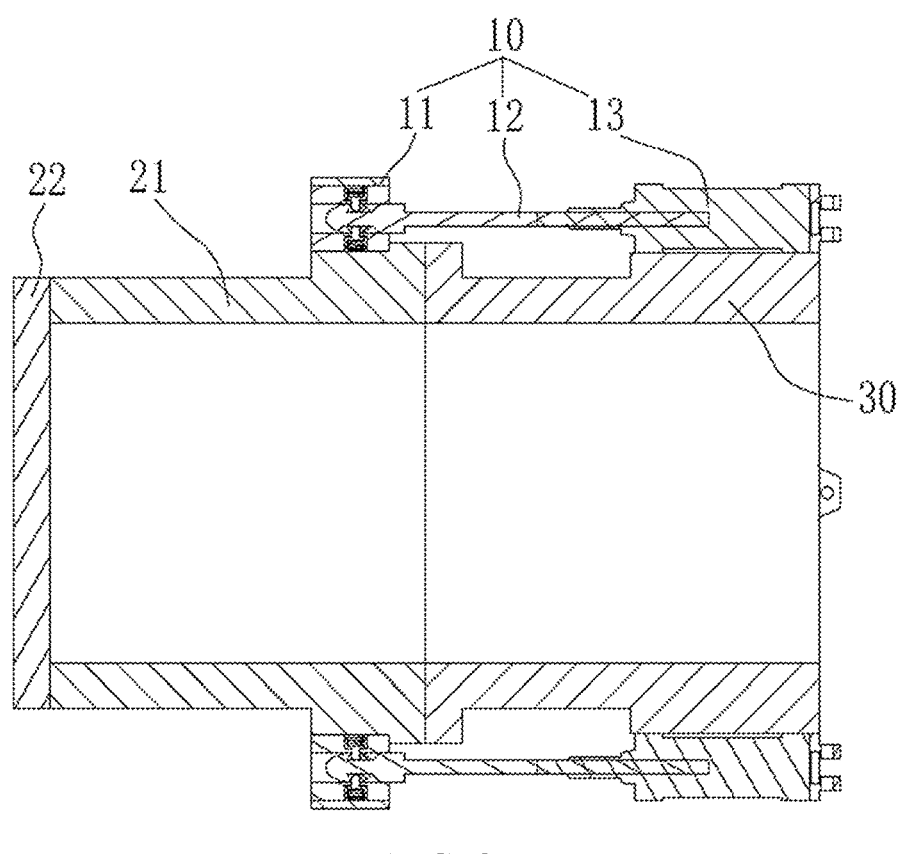
FIG. 2 is a schematic structural diagram of the structure shown in FIG. 1 in a cross-sectional view state.

A quickly assemblable and disassemblable target part connecting structure for BNCT in this embodiment, as shown in FIG. 1 and FIG. 2, includes a target section 20, a pipeline section 30 and a plurality of locking devices 10 configured to connect the target section 20 and the pipeline section 30. The target section 20 includes a sleeve 21 and a target body 22 located at one end of the sleeve. One end of the sleeve 21 that is docked with the pipeline section 30 is provided with a first flange 23. Correspondingly, one end of the pipeline section 30 that is docked with the target section 20 is provided with a second flange 31 that is docked with the first flange 23. A sealing part (not shown in the figure) is disposed between the first flange 23 and the second flange 31.

Figure 3:
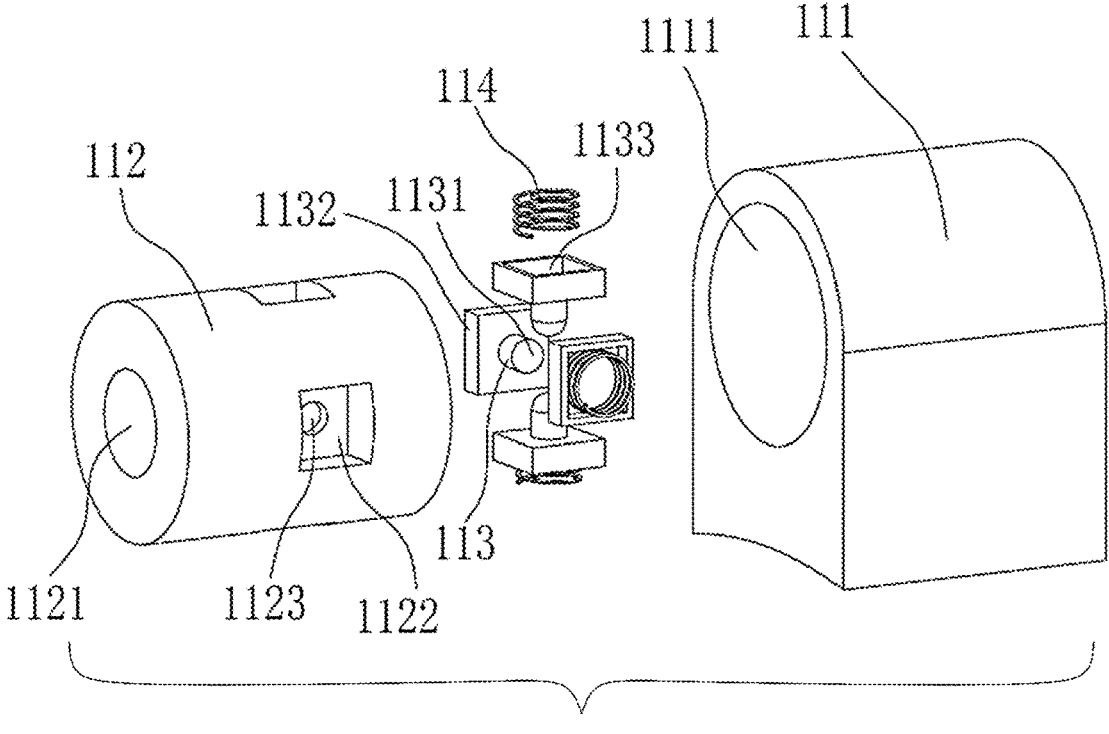
FIG. 3 is a schematic structural diagram of a lock body in an exploded state in this embodiment.

As a special feature of this embodiment, as shown in FIG. 1-FIG. 3 and FIG. 6, the locking device includes a lock body 11, a lock rod 12 and a driving mechanism 13. Among them, the structure of the lock body 11 is as shown in FIG. 3, including an inner sleeve 112 and an outer sleeve 111 nested with each other, where the outer sleeve 111 is provided with a mounting hole 111 configured to accommodate the inner sleeve 112. Preferably, the inner sleeve has an interference fit with the mounting hole 111.

In this embodiment, the inner sleeve 112 is provided with an axially through lock hole 1121, and the inner sleeve 112 is also provided with four mounting portions configured to install a locking pin 113 along a circumferential direction.

Preferably, in this embodiment, the mounting portion includes a sinking groove 1122 disposed on an outer wall of the inner sleeve and a pin hole 1123 radially penetrating from the sinking groove to the lock hole 1121.

Correspondingly, in this embodiment, a tail end of the locking pin 113 is provided with a boss 1132 adapted to the sinking groove 1122. The locking pin 1131 is inserted into the pin hole 1123 from the sinking groove 1122 and protrudes radially from an inner wall of the lock hole 1121, where the locking pin can move radially in the pin hole.

In this embodiment, an elastic part 114 is disposed between the boss 1132 and an inner wall of the mounting hole 111 to provide elastic force for elastic extension and contraction of the locking pin. Preferably, the elastic part 114 is a compression spring.

Preferably, in this embodiment, one end of the boss 1132 away from the locking pin 113 is also provided with a spring accommodating groove 1133 for accommodating the compression spring.

In this embodiment, a free end of the locking pin 113 is provided with a first guide portion 1131, and the first guide portion 1131 is provided with a conical face or an arc-shaped face.

Figure 4:
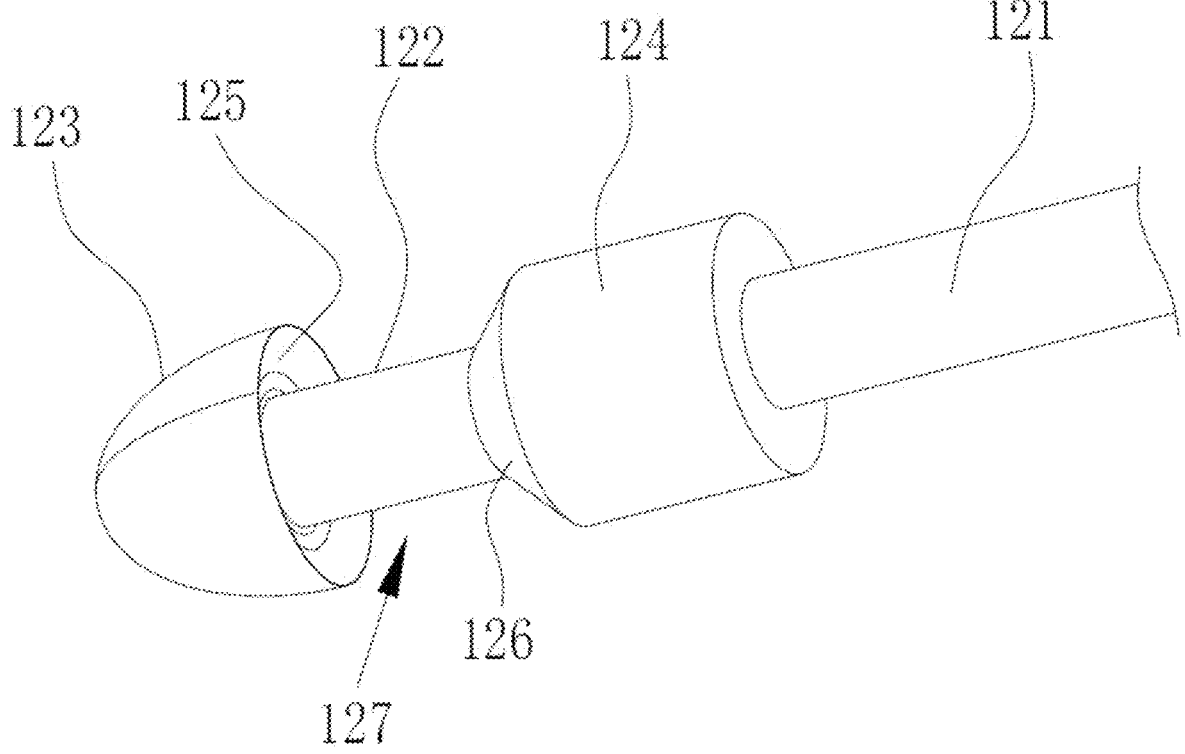
FIG. 4 is a partial schematic structural diagram of a lock rod in this embodiment.
Figure 5:
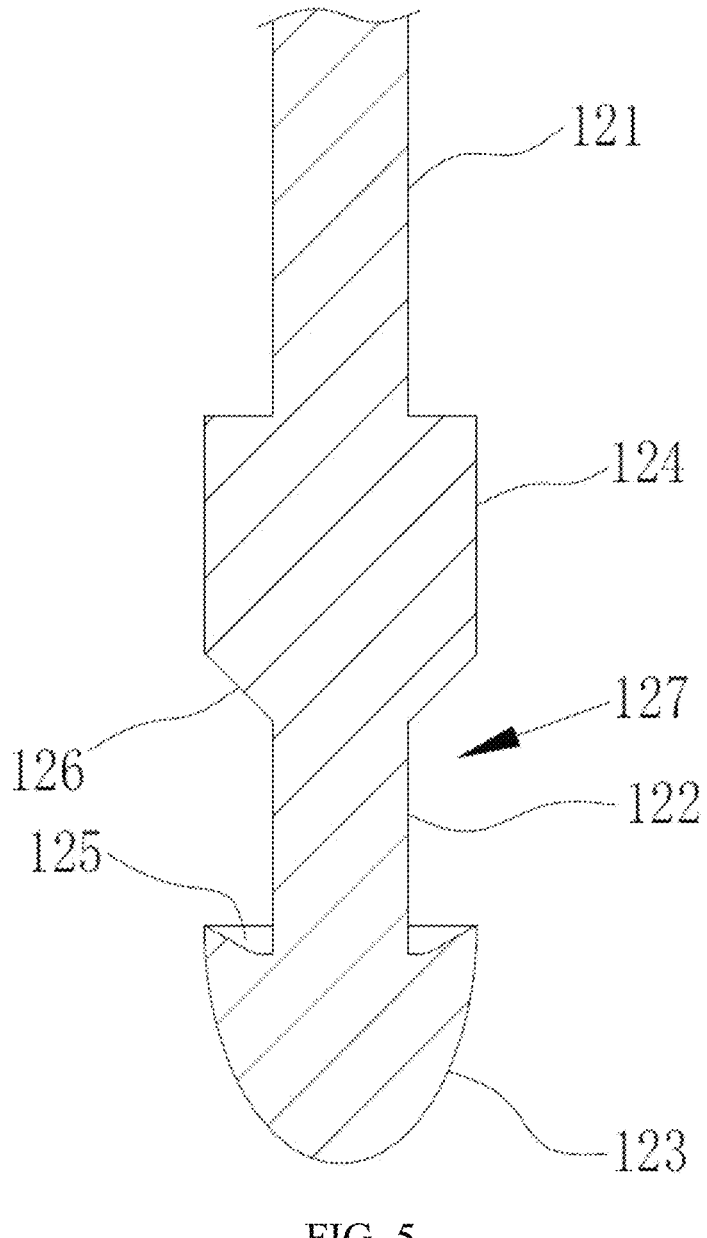
FIG. 5 is a schematic structural diagram of the lock rod shown in FIG. 4 in a cross-sectional view state.

As shown in FIG. 4 and FIG. 5, the lock rod 12 of this embodiment includes a rod body 121 and a lock head located at an end of the rod body and configured to be adapted to the lock hole 1121. One end of the rod body 121 away from the lock head is connected to the driving mechanism 13, and the driving mechanism 13 drives the lock rod 12 to move axially relative to the lock body 11. It should be noted that the driving mechanism 13 can be selected from an existing linear driving mechanism, including but not limited to a linear motor, a hydraulic cylinder and a pneumatic cylinder.

In this embodiment, the lock head includes a lock groove section 122, an end head 123 located at one end of the lock groove section and a locking section 124 located at the other end of the lock groove section. The lock groove section 122 is provided with a lock groove 127 for accommodating extension of the locking pin 113 along the radial direction.

In this embodiment, outer diameters of the end head 123 and the locking section 124 are larger than an outer diameter of the lock groove section 122, thus forming the lock groove on the lock groove section. It should be noted that, in this embodiment, the rod body 121 and the locking section 124 are structures with different diameters. Of course, the two can also be an integrated structure with the same diameter.

In this embodiment, a free end of the end head 123 is provided with a second guide portion configured to be in guiding cooperation with the first guide portion 1131 of the locking pin 113, and the second guide portion is provided with a conical face or an arc-shaped face.

Figure 6:
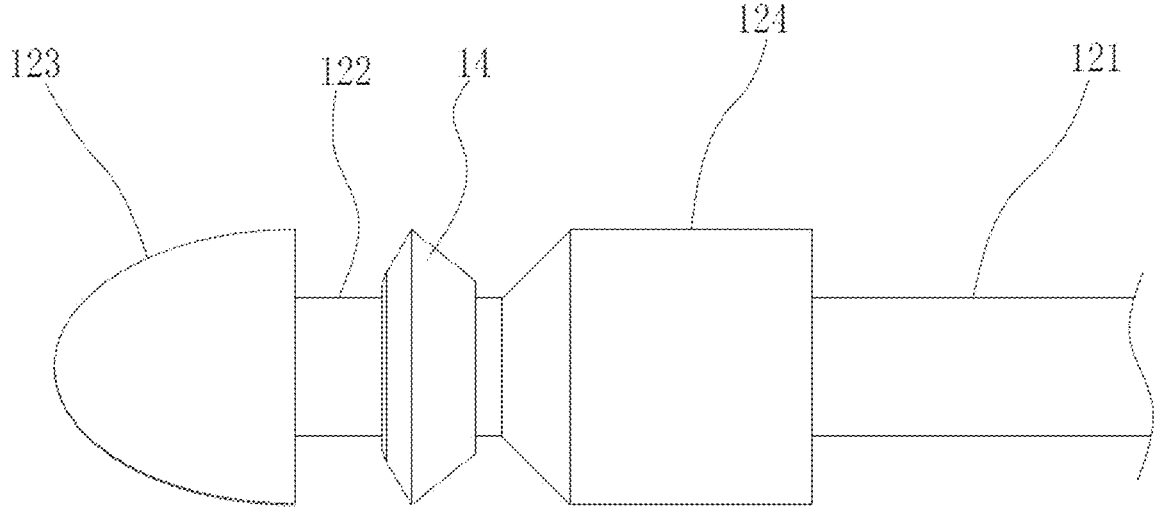
FIG. 6 is a partial schematic structural diagram of the lock rod and a sliding block in an assembled state in this embodiment.
Figure 7:
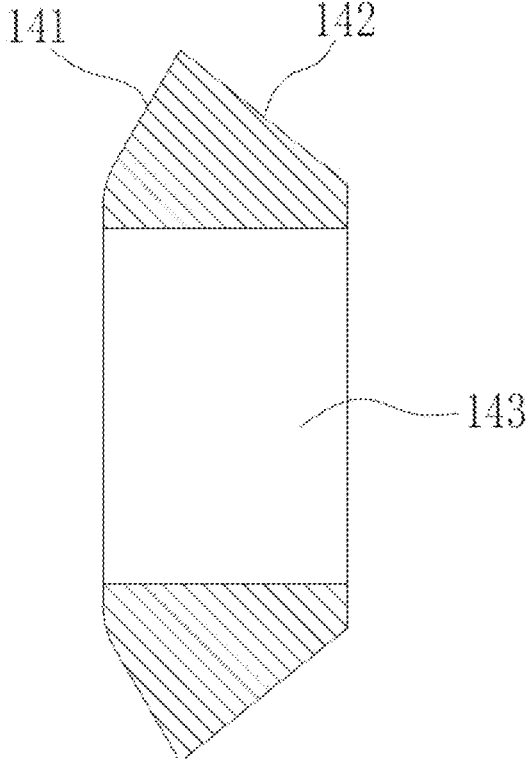
FIG. 7 is a schematic structural diagram of the sliding block in this embodiment.

As a special feature of this embodiment, as shown in FIG. 6 and FIG. 7, the lock groove section 122 is also sleeved with a sliding block 14. The sliding block 14 has an axially through hole 143. The axially through hole 143 has a clearance fit with the lock groove section 122, is axially slidably connected with the lock groove section, and can move axially on the lock groove section 122.

Figure 8:
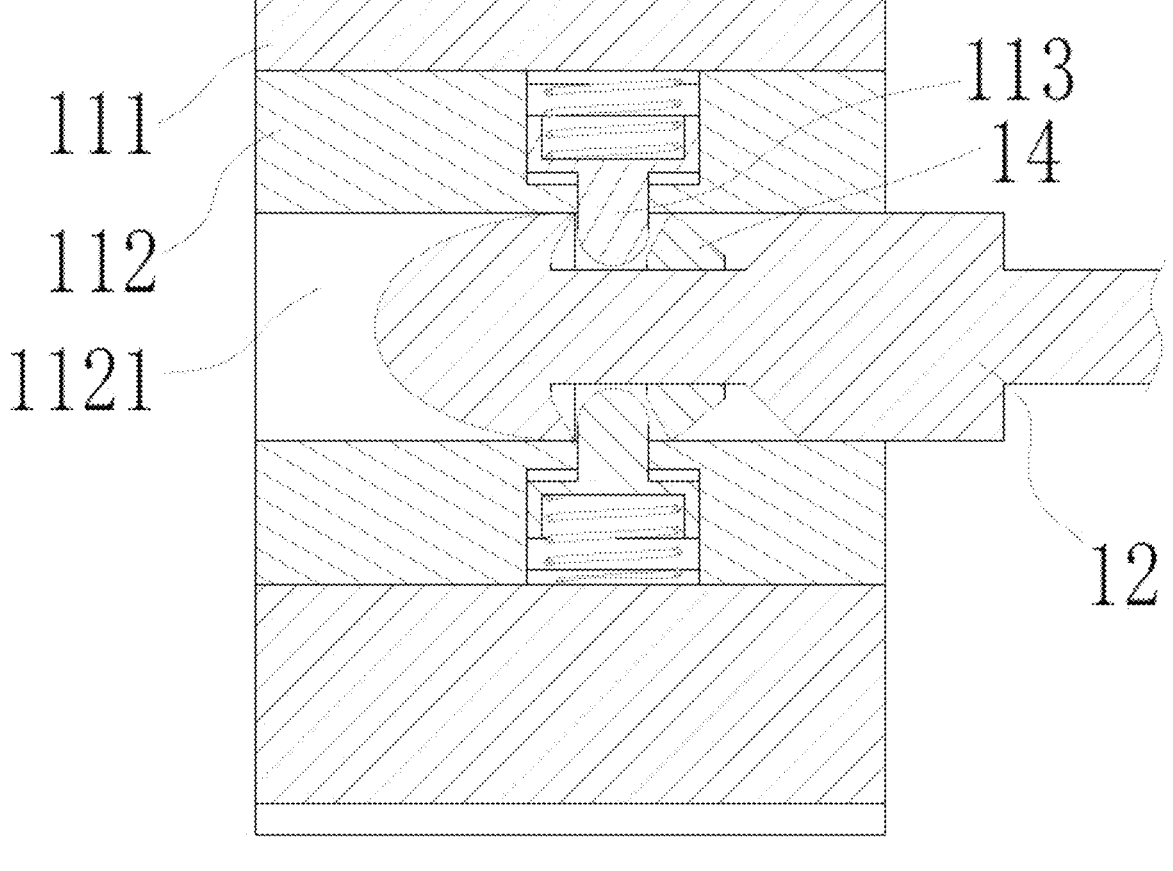
FIG. 8 is a schematic structural diagram of a locking device in a locked state in this embodiment.
Figure 9:
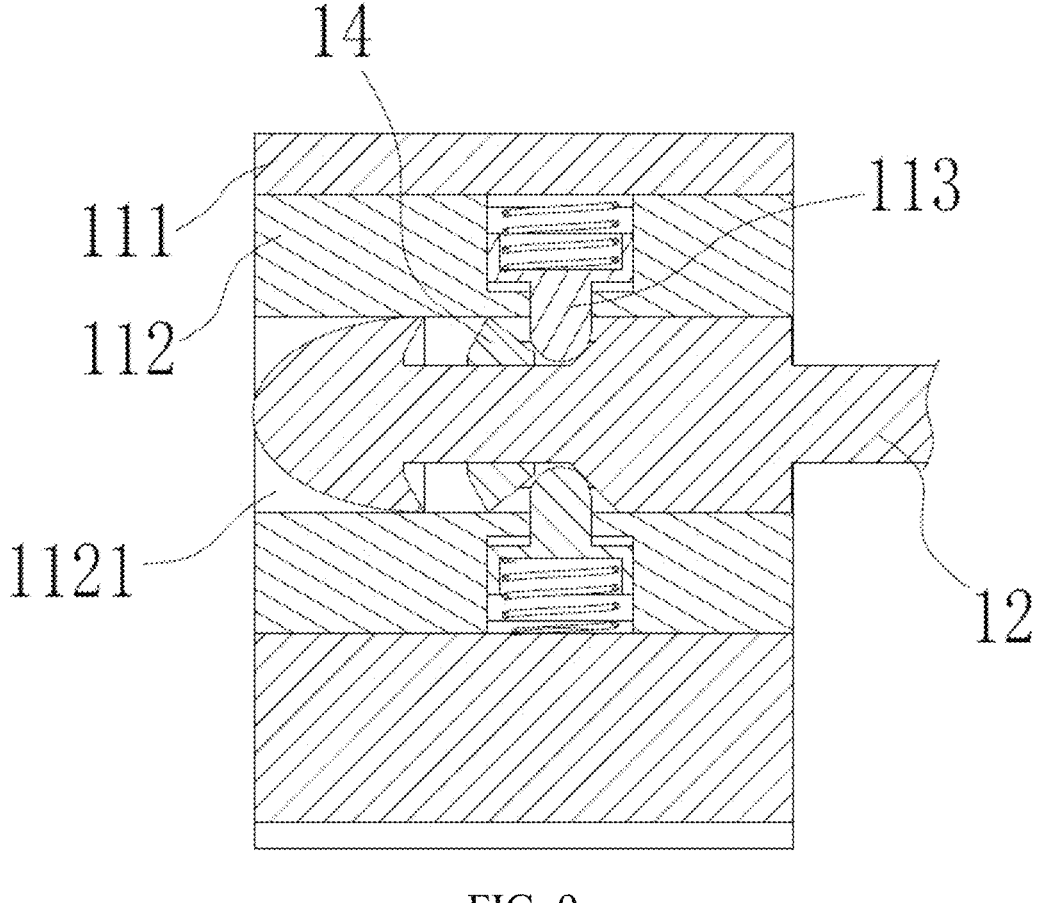
FIG. 9 is a schematic structural diagram of the locking device after a locking pin passes over the sliding block in an unlocking process in this embodiment.
Figure 10:
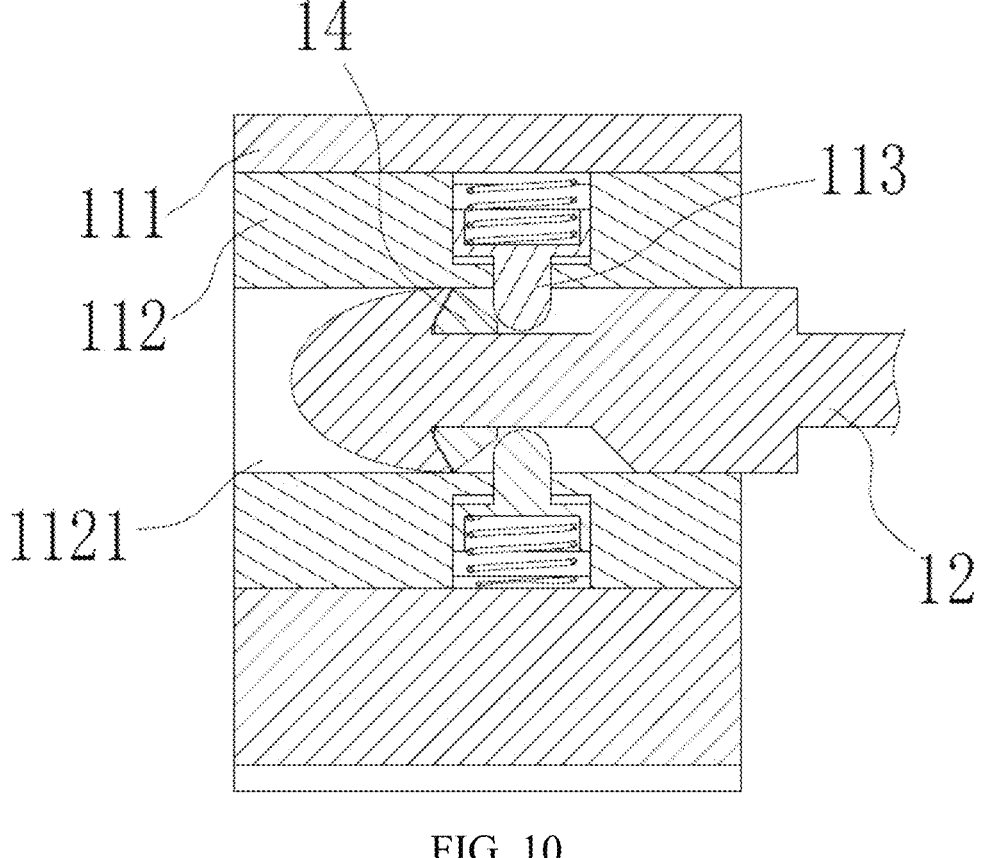
FIG. 10 is a schematic structural diagram of the locking device after the locking pin drives the sliding block to move axially until a first guide face enters an accommodating groove in the unlocking process in this embodiment.

In this embodiment, as shown in FIG. 8, in a locked state, the locking pin 113 is located in the lock groove 127 between the end head 123 and the sliding block 14; and as shown in FIG. 9 and FIG. 10, in an unlocked state, the locking pin 113 is located in the lock groove 127 between the sliding block 14 and the locking section 124.

In this embodiment, the sliding block 14 is provided with a guide face in guiding cooperation with the first guide portion 1131 of the locking pin 113. As shown in FIG. 7, the guide face includes a first guide face 141 on a side close to the end head 123 and a second guide face 142 on a side close to the locking section 124. The first guide face 141 and the second guide face 142 are conical faces or arc-shaped faces.

Preferably, in this embodiment, the first guide face 141 and the second guide face 142 converge at a maximum outer diameter of the sliding block 14. With this arrangement, the locking pin can more easily pass over the sliding block.

In this embodiment, as shown in FIG. 4 and FIG. 5, one side of the end head 123 close to the lock groove section 122 is provided with an accommodating groove 125 for accommodating the first guide face 141. The purpose of this arrangement is that, as shown in FIG. 9 and FIG. 10, in an unlocking process, when the sliding block 14 is located between the locking pin and the end head, as the lock rod moves backward, the first guide face 141 enters the accommodating groove 125, preventing the locking pin from entering between the sliding block and the end head again and ensuring the reliability of the unlocking process.

Preferably, in this embodiment, as shown in FIG. 4-FIG. 6, one end of the locking section 124 close to the lock groove section 122 is provided with an inclined transition portion 126. As shown in FIG. 9, in the unlocking process, after the locking pin passes over the sliding block, it provides larger entry space for the locking pin to enter the lock groove.

In this embodiment, the lock body 11 is fixedly disposed on the target section 20, and the driving mechanism 13 is fixedly disposed on the pipeline section 30. Equivalently, the lock body 11 can also be disposed on the pipeline section 30, and correspondingly, the driving mechanism 13 can also be disposed on the target section 20.

In this embodiment, a method for assembling and disassembling the above quickly assemblable and disassemblable target part connecting structure for BNCT includes the following steps.

Step 10. a locking step, including:

step 11. aligning the lock rod with the lock body.

step 12, driving, by the driving mechanism, the lock rod to move forward until the lock head enters the lock hole. The sliding block is on the side close to the locking section, and the second guide portion of the lock head acts on the first guide portion of the locking pin, driving the locking pin to move radially outward. After the end head of the lock head passes over the locking pin, under the reset action of the elastic part, the locking pin enters the lock groove. As shown in FIG. 8, in this state, the locking pin is located in the lock groove between the end head and the sliding block.

Then, the driving mechanism drives the lock rod to move backward, continuously pulling the lock rod backward for locking, so as to lock the target section and the pipeline section.

In this embodiment, due to the pulling force applied by the driving mechanism, the connection between the target section and the pipeline section is tighter and more reliable. In particular, the sealing part is disposed between the first flange and the second flange, and the sealing is more reliable based on the continuous action of the pulling force.

Step 20. an unlocking step, including:

step 21, driving, by the driving mechanism, the lock rod to move forward, and acting, by the first guide face of the sliding block, on the first guide portion of the locking pin, driving the locking pin to move radially outward until the sliding block passes over the locking pin. Under the reset action of the elastic part, as shown in FIG. 9, the locking pin enters the lock groove behind the sliding block. In this state, the locking pin is located in the lock groove between the sliding block and the locking section.

step 22, driving, by the driving mechanism, the lock rod to move backward, and acting, by the locking pin, on the second guide face of the sliding block. As shown in FIG. 10, it drives the sliding block to move axially towards the end head until the first guide face of the sliding block enters the accommodating groove. The driving mechanism drives the lock rod to continue moving backward, and the second guide face of the sliding block acts on the first guide portion of the locking pin, driving the locking pin to move radially outward. The locking pin disengages from the lock groove. After the sliding block and the end head pass over the locking pin in sequence, the lock head exits from the lock hole, and the lock rod is separated from the lock body, thus releasing the connection state between the target section and the pipeline section.

In this embodiment, the connection between the target section and the pipeline section is achieved through the locking device, and the rapid connection and quick disassembly can be achieved based on program control, solving the problems of the time-consuming and labor-intensive process and cumbersome operation of the traditional connection method. The convenience of replacing the target section and maintaining the vacuum system in the BNCT system is improved.

In conclusion, the above descriptions are only preferred embodiments of the present invention and are not intended to limit the present invention. Any modifications, equivalent substitutions, improvements, etc. made within the spirit and principles of the present invention shall be included within the scope of protection of the present invention.

What is claimed is:

1. An assemblable and disassemblable target part connecting structure for a boron neutron capture therapy, comprising: a target section, a pipeline section, and at least one locking device configured to connect the target section and the pipeline section, wherein the at least one locking device comprises:

a lock body provided with a locking pin configured for elastically extending and contracting along a radial direction;

a lock rod provided with a lock groove for accommodating an extension of the locking pin along the radial direction, wherein a sliding block is slidably connected in the lock groove along an axial direction, two ends of the sliding block are each provided with a first guide face and a second guide face, and the first guide face and the second guide face converge at a maximum outer diameter of the sliding block; and a driving mechanism configured to drive the lock rod to telescopically move along the axial direction relative to the lock body and provide a continuous pulling force in a locked state, wherein the driving mechanism and the lock body are fixedly disposed on the target section and the pipeline section respectively, a first end of the lock rod is fixedly connected with the driving mechanism, and a second end of the lock rod is a free end; a side of the lock groove adjacent to the free end of the lock rod is provided with an accommodating groove adapted to the first guide face; and the free end of the lock rod is provided with a second guide portion.

2. The assemblable and disassemblable target part connecting structure according to claim 1, wherein the lock body is provided with a lock hole for accommodating an extension of the lock rod along the axial direction, and an inner wall of the lock hole is provided with the locking pin along a circumferential direction.

3. The assemblable and disassemblable target part connecting structure according to claim 2, wherein a free end of the locking pin is provided with a first guide portion.

4. The assemblable and disassemblable target part connecting structure according to claim 2, wherein the lock body comprises an inner sleeve and an outer sleeve nested with each other, the lock hole is disposed on the inner sleeve, and the inner sleeve is provided with a mounting portion configured to mount the locking pin.

5. The assemblable and disassemblable target part connecting structure according to claim 4, wherein a free end of the locking pin is provided with a first guide portion.

6. The assemblable and disassemblable target part connecting structure according to claim 4, wherein the mounting portion comprises a sinking groove disposed on an outer wall of the inner sleeve and a pin hole radially penetrating from the sinking groove to the lock hole; and a tail end of the locking pin is provided with a boss adapted to the sinking groove.

7. The assemblable and disassemblable target part connecting structure according to claim 6, wherein a free end of the locking pin is provided with a first guide portion.

8. The assemblable and disassemblable target part connecting structure according to claim 6, wherein an elastic part is disposed between the boss and an inner wall of the outer sleeve.

9. The assemblable and disassemblable target part connecting structure according to claim 8, wherein a free end of the locking pin is provided with a first guide portion.

10. The assemblable and disassemblable target part connecting structure according to claim 1, wherein the free end of the lock rod is provided with a lock head, the lock head sequentially comprises an end head, a lock groove section, and a locking section, and the lock groove is located on the lock groove section.

11. The assemblable and disassemblable target part connecting structure according to claim 10, wherein a free end of the locking pin is provided with a first guide portion.

12. The assemblable and disassemblable target part connecting structure according to claim 10, wherein an end of the locking section adjacent to the lock groove section is provided with an inclined transition portion.

13. The assemblable and disassemblable target part connecting structure according to claim 12, wherein a free end of the locking pin is provided with a first guide portion.

14. The assemblable and disassemblable target part connecting structure according to claim 10, wherein the sliding block is sleeved on the lock groove section.

15. The assemblable and disassemblable target part connecting structure according to claim 14, wherein a free end of the locking pin is provided with a first guide portion.

16. The assemblable and disassemblable target part connecting structure according to claim 1, wherein the driving mechanism comprises a linear motor, a hydraulic cylinder, or a pneumatic cylinder.

17. The assemblable and disassemblable target part connecting structure according to claim 1, wherein the first guide face and the second guide face are conical faces or arc-shaped faces.

18. The assemblable and disassemblable target part connecting structure according to claim 1, wherein a free end of the locking pin is provided with a first guide portion.

19. The assemblable and disassemblable target part connecting structure according to claim 18, wherein the first guide portion and/or the second guide portion is provided with a conical face or an arc-shaped face.

20. A method for assembling and disassembling the assemblable and disassemblable target part connecting structure for the boron neutron capture therapy according to claim 1, at least comprising steps of:

a locking step, comprising:

aligning the lock rod with the lock body; and driving, by the driving mechanism, the lock rod to move forward until the locking pin enters the lock groove, and continuously pulling, by the driving mechanism, the lock rod backward for locking to lock the target section and the pipeline section; and an unlocking step, comprising:

driving, by the driving mechanism, the lock rod to move forward until the locking pin passes over the sliding block via the first guide face and enters the lock groove behind the sliding block; and driving, by the driving mechanism, the lock rod to move backward, and after the locking pin acts on the second guide face of the sliding block to drive the sliding block to slide forward until the first guide face enters the accommodating groove, disengaging the locking pin from the lock groove via the second guide face, and separating the lock rod from the lock body to release a connection state between the target section and the pipeline section.

\*   \*   \*   \*   \*